US012581165B2

(12) United States Patent
Petty

(10) Patent No.: US 12,581,165 B2
(45) Date of Patent: *Mar. 17, 2026

(54) SYSTEM AND METHOD FOR AUDIO VISUAL CONTENT CREATION AND PUBLISHING WITHIN A CONTROLLED ENVIRONMENT

(71) Applicant: **Global Tel*Link Corporation**, Reston, VA (US)

(72) Inventor: Alex Petty, Mobile, AL (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,239

(22) Filed: May 6, 2024

(65) Prior Publication Data

US 2024/0348881 A1     Oct. 17, 2024

Related U.S. Application Data

(63) Continuation of application No. 17/466,613, filed on Sep. 3, 2021, now Pat. No. 12,022,157, which is a
(Continued)

(51) Int. Cl.
*H04N 21/4627* (2011.01)
*G06F 40/295* (2020.01)
(Continued)

(52) U.S. Cl.
CPC ....... *H04N 21/4627* (2013.01); *G06F 40/295* (2020.01); *G06V 20/41* (2022.01);
(Continued)

(58) Field of Classification Search
CPC .......................... H04N 21/454; H04N 21/4542
See application file for complete search history.

(56) References Cited

U.S. PATENT DOCUMENTS 5,757,417 A     5/1998  Aras et al.
5,796,948 A     8/1998  Cohen
(Continued)

FOREIGN PATENT DOCUMENTS

WO     WO 2013/096944 A1     6/2013

OTHER PUBLICATIONS

Copyright Registration Record for "iPhone: The Missing Manual," 6th ed., 2012; 1 page.
(Continued)

*Primary Examiner* — Jialong He
(74) *Attorney, Agent, or Firm* — Sterne, Kessler, Goldstein & Fox P.L.L.C.

(57) ABSTRACT

Methods and systems for providing content creation and content publishing in a controlled environment are disclosed herein. A media management device receives an audio track including lyrical content. Further, the media management device performs speech recognition analysis on the audio track to determine lyrical text corresponding to the lyrical content. Additionally, the media management device determines whether the audio track contains prohibited content based on comparing the lyrical text to a blacklist of prohibited information. When the audio track does not include prohibited content, the media management device publishes the audio track to a media library accessible to devices within the controlled environment.

17 Claims, 8 Drawing Sheets

Related U.S. Application Data continuation of application No. 16/723,632, filed on Dec. 20, 2019, now Pat. No. 11,115,716, which is a continuation of application No. 16/025,721, filed on Jul. 2, 2018, now Pat. No. 10,516,918, which is a continuation of application No. 15/662,092, filed on Jul. 27, 2017, now Pat. No. 10,015,546.

(51) Int. Cl.

| | |
|---|---|
| *G06V 20/40* | (2022.01) |
| *G10L 15/26* | (2006.01) |
| *G11B 27/036* | (2006.01) |
| *H04N 5/76* | (2006.01) |
| *H04N 9/802* | (2006.01) |
| *H04N 9/87* | (2006.01) |
| *H04N 21/214* | (2011.01) |
| *H04N 21/233* | (2011.01) |
| *H04N 21/234* | (2011.01) |
| *H04N 21/2343* | (2011.01) |
| *H04N 21/254* | (2011.01) |
| *H04N 21/45* | (2011.01) |
| *H04N 21/472* | (2011.01) |
| *H04N 21/6543* | (2011.01) |

(52) U.S. Cl.
CPC ............ *G10L 15/26* (2013.01); *G11B 27/036* (2013.01); *H04N 5/76* (2013.01); *H04N 9/802* (2013.01); *H04N 9/8715* (2013.01); *H04N 21/2143* (2013.01); *H04N 21/233* (2013.01); *H04N 21/23418* (2013.01); *H04N 21/234336* (2013.01); *H04N 21/2541* (2013.01); *H04N 21/4532* (2013.01); *H04N 21/47205* (2013.01); *H04N 21/6543* (2013.01)

(56) References Cited

U.S. PATENT DOCUMENTS

| | | | |
|---|---|---|---|
| 6,330,537 | B1 | 12/2001 | Davis et al. |
| 6,684,240 | B1 | 1/2004 | Goddard |
| 6,734,900 | B2 | 5/2004 | Mayhew |
| 6,740,802 | B1 | 5/2004 | Browne, Jr. |
| 6,810,527 | B1 | 10/2004 | Conrad et al. |
| 6,829,582 | B1 | 12/2004 | Barsness |
| 7,027,659 | B1 | 4/2006 | Thomas |
| 7,752,274 | B2 | 7/2010 | Pagan |
| 7,818,392 | B1 | 10/2010 | Martino et al. |
| 7,911,513 | B2 | 3/2011 | Garrison et al. |
| 7,973,230 | B2 | 7/2011 | Mahowald |
| 8,005,913 | B1 | 8/2011 | Carlander |
| 8,131,763 | B2 | 3/2012 | Tuscano et al. |
| 8,358,837 | B2 | 1/2013 | Shakya et al. |
| 8,380,725 | B2 | 2/2013 | Borst et al. |
| 8,537,981 | B1 | 9/2013 | Cyriac et al. |
| 8,700,409 | B1 | 4/2014 | Persson et al. |
| 8,789,040 | B1 | 7/2014 | Callary |
| 8,832,374 | B1 | 9/2014 | Schaefers |
| 8,917,848 | B2 | 12/2014 | Torgersrud et al. |
| 8,929,525 | B1 | 1/2015 | Edwards |
| 9,083,850 | B1 | 7/2015 | Higgs |
| 9,106,789 | B1 | 8/2015 | Shipman, Jr. et al. |
| 9,282,087 | B1 | 3/2016 | Fredinburg et al. |
| 9,332,014 | B2 | 5/2016 | Keiser et al. |
| 9,674,198 | B1 | 6/2017 | Hodge |
| 10,015,546 | B1 | 7/2018 | Petty |
| 10,122,825 | B1 | 11/2018 | Petty |
| 10,405,007 | B2 | 9/2019 | Hodge |
| 10,516,918 | B2 | 12/2019 | Petty |
| 11,108,885 | B2 | 8/2021 | Petty |
| 11,113,757 | B1 | 9/2021 | Latorre et al. |
| 11,115,716 | B2 | 9/2021 | Petty |
| 2001/0001159 | A1 | 5/2001 | Ford |
| 2002/0147782 | A1 | 10/2002 | Dimitrova et al. |
| 2003/0126267 | A1 | 7/2003 | Gutta et al. |
| 2003/0192044 | A1 | 10/2003 | Huntsman |
| 2004/0006767 | A1 | 1/2004 | Robson et al. |
| 2004/0172652 | A1 | 9/2004 | Fisk et al. |
| 2005/0022229 | A1 | 1/2005 | Gabriel et al. |
| 2005/0268317 | A1 | 12/2005 | Cormack et al. |
| 2006/0031870 | A1 | 2/2006 | Jarman et al. |
| 2006/0075015 | A1 | 4/2006 | Wu et al. |
| 2006/0095262 | A1 | 5/2006 | Danieli |
| 2006/0280177 | A1 | 12/2006 | Gupta et al. |
| 2007/0015573 | A1 | 1/2007 | Angell |
| 2007/0157281 | A1 | 7/2007 | Ellis et al. |
| 2007/0179355 | A1 | 8/2007 | Rosen |
| 2007/0202941 | A1 | 8/2007 | Miltenberger et al. |
| 2007/0263809 | A1* | 11/2007 | Sharma ............ H04M 3/42017 |
| | | | 379/142.01 |
| 2008/0059991 | A1 | 3/2008 | Romano |
| 2008/0109369 | A1 | 5/2008 | Yi-Ling et al. |
| 2008/0134282 | A1 | 6/2008 | Fridman et al. |
| 2008/0177834 | A1 | 7/2008 | Gruhl et al. |
| 2008/0184284 | A1 | 7/2008 | O'Hern |
| 2008/0201158 | A1 | 8/2008 | Johnson et al. |
| 2008/0250484 | A1 | 10/2008 | Chong et al. |
| 2009/0013052 | A1 | 1/2009 | Robarts et al. |
| 2009/0013359 | A1 | 1/2009 | Butler et al. |
| 2009/0089828 | A1 | 4/2009 | Carlsgaard et al. |
| 2009/0177670 | A1 | 7/2009 | Grenier et al. |
| 2009/0228557 | A1 | 9/2009 | Ganz et al. |
| 2009/0234784 | A1 | 9/2009 | Buriano et al. |
| 2009/0240586 | A1 | 9/2009 | Ramer et al. |
| 2009/0254499 | A1 | 10/2009 | Deyo |
| 2009/0313546 | A1 | 12/2009 | Katpelly et al. |
| 2009/0328093 | A1 | 12/2009 | Cansler et al. |
| 2010/0094878 | A1 | 4/2010 | Soroca et al. |
| 2010/0138455 | A1 | 6/2010 | Alewine |
| 2010/0312542 | A1 | 12/2010 | Van Wyk et al. |
| 2011/0004831 | A1 | 1/2011 | Steinberg et al. |
| 2011/0065419 | A1 | 3/2011 | Book et al. |
| 2011/0093473 | A1 | 4/2011 | Basso et al. |
| 2011/0153328 | A1 | 6/2011 | Lim et al. |
| 2011/0237221 | A1 | 9/2011 | Prakash et al. |
| 2011/0249073 | A1 | 10/2011 | Cranfill et al. |
| 2011/0251901 | A1 | 10/2011 | Kwon et al. |
| 2011/0307548 | A1 | 12/2011 | Fisk et al. |
| 2012/0124638 | A1 | 5/2012 | King et al. |
| 2012/0201362 | A1 | 8/2012 | Crossan et al. |
| 2012/0239763 | A1 | 9/2012 | Musil |
| 2012/0257583 | A1 | 10/2012 | Keiser et al. |
| 2012/0262271 | A1 | 10/2012 | Torgersrud et al. |
| 2012/0324244 | A1 | 12/2012 | Zipperer et al. |
| 2012/0324504 | A1 | 12/2012 | Archer et al. |
| 2013/0085825 | A1 | 4/2013 | Davis et al. |
| 2013/0090917 | A1 | 4/2013 | Chalmers et al. |
| 2013/0179949 | A1 | 7/2013 | Shapiro |
| 2013/0252575 | A1 | 9/2013 | Ewell et al. |
| 2014/0033230 | A1 | 1/2014 | Hanna et al. |
| 2014/0200893 | A1* | 7/2014 | Vanjani ............. H04N 21/4532 |
| | | | 704/257 |
| 2014/0215391 | A1 | 7/2014 | Little et al. |
| 2014/0218466 | A1 | 8/2014 | Bloms et al. |
| 2014/0253663 | A1 | 9/2014 | Edwards |
| 2014/0267547 | A1 | 9/2014 | Torgersrud et al. |
| 2014/0270126 | A1 | 9/2014 | Torgersrud et al. |
| 2014/0273929 | A1 | 9/2014 | Torgersrud |
| 2014/0279789 | A1 | 9/2014 | Torgersrud |
| 2014/0280524 | A1 | 9/2014 | Paradise et al. |
| 2014/0280559 | A1 | 9/2014 | Torgersrud |
| 2014/0280632 | A1 | 9/2014 | Torgersrud et al. |
| 2014/0282898 | A1 | 9/2014 | Torgersrud |
| 2014/0304283 | A1 | 10/2014 | Athsani et al. |
| 2014/0325561 | A1 | 10/2014 | Allen et al. |
| 2014/0344956 | A1 | 11/2014 | Garben |
| 2015/0050910 | A1 | 2/2015 | Torgersrud |
| 2015/0070516 | A1 | 3/2015 | Shoemake et al. |
| 2015/0188925 | A1 | 7/2015 | Gupta |
| 2015/0215254 | A1 | 7/2015 | Bennett |
| 2015/0301703 | A1 | 10/2015 | Steinberg et al. |
| 2016/0191484 | A1 | 6/2016 | Gongaware |

(56) References Cited

U.S. PATENT DOCUMENTS

| | | | |
|---|---|---|---|
| 2016/0246791 A1 | 8/2016 | Long et al. | |
| 2016/0300388 A1 | 10/2016 | Stafford | |
| 2016/0381083 A1 | 12/2016 | Torgersrud et al. | |
| 2017/0064384 A1 | 3/2017 | Sahoo et al. | |
| 2017/0262635 A1 | 9/2017 | Strauss et al. | |
| 2017/0272435 A1 | 9/2017 | Hodge | |
| 2017/0272440 A1 | 9/2017 | Hodge | |
| 2018/0197532 A1* | 7/2018 | Rajendran | G10L 15/22 |
| 2018/0357306 A1* | 12/2018 | Osotio | G06F 16/3329 |
| 2018/0366097 A1 | 12/2018 | Sharp | |
| 2019/0037247 A1 | 1/2019 | Hodge | |
| 2019/0069029 A1 | 2/2019 | Petty | |
| 2019/0141164 A1 | 5/2019 | Petty | |
| 2019/0387255 A1 | 12/2019 | Hodge | |
| 2022/0053239 A1 | 2/2022 | Petty | |

OTHER PUBLICATIONS

DSKeye Gigabit Product Brief, Bitec Ltd. 2007; 2 pages.
Excerpt from Merriam-Webster's Collegiate Dictionary, Tenth Edition, 2002; p. 841.
Excerpt from The American Heritage Dictionary, 5th Ed. (2016); p. 679.
Excerpts from "iPhone: The Missing Manual," 6th ed., Sebastopol, CA: O'Reilly Media, 2012; 556 (submitted in 10 parts).
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.
International Search Report and Written Opinion directed to International Patent Appl. No. PCT/US2017/031317, mailed Aug. 2, 2017; 16 pages.
International Search Report and Written Opinion directed to International Patent Application No. PCT/US2017/022163, mailed Jun. 9, 2017; 12 pages.
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.
OpenSong Getting Started. Online, retrieved from www.archive.org, Archive date: 2016. 6 pages.
ScoreCloud, Online, retrieved from www.archive.org, Archive date: 2016. 3 pages.
Censorship of Music (Wikipedia), retrieved from www.archive.org, Archive date: 2016. 15 pages.
Janet Burns, "A Brief History of the Devil's Tritone", online "https://www.mentalfloss.com", published Mar. 28, 2016; 5 pages.
Mathur et al., "Generating Subtitles Automatically Using Audio Extraction and Speech Recognition," 2015 IEEE International Conference on Computational Intelligence & Communication Technology, IEEE, 2015; pp. 621-626.

* cited by examiner

400

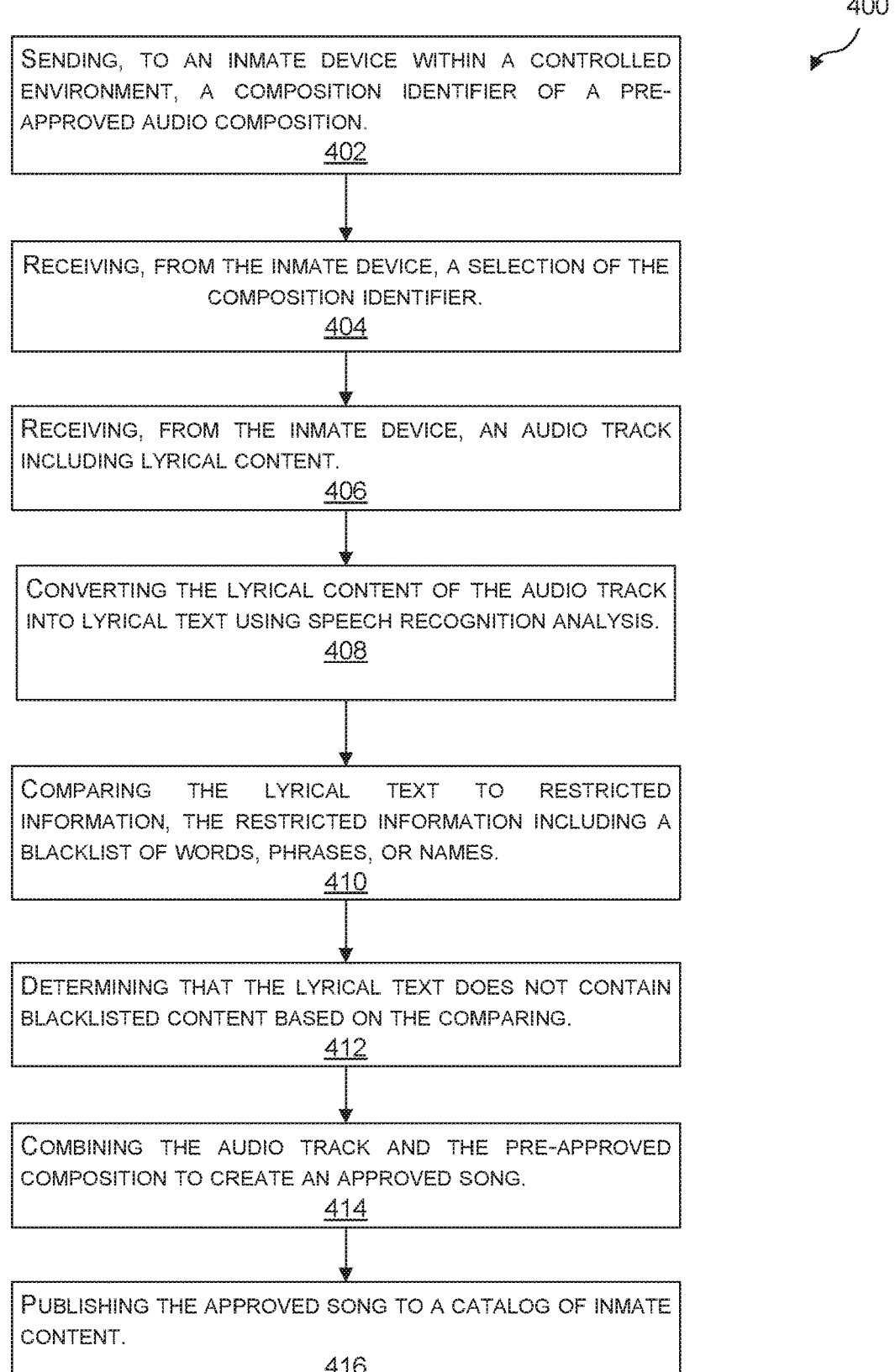

SENDING, TO AN INMATE DEVICE WITHIN A CONTROLLED ENVIRONMENT, A COMPOSITION IDENTIFIER OF A PRE-APPROVED AUDIO COMPOSITION.
402

RECEIVING, FROM THE INMATE DEVICE, A SELECTION OF THE COMPOSITION IDENTIFIER.
404

RECEIVING, FROM THE INMATE DEVICE, AN AUDIO TRACK INCLUDING LYRICAL CONTENT.
406

CONVERTING THE LYRICAL CONTENT OF THE AUDIO TRACK INTO LYRICAL TEXT USING SPEECH RECOGNITION ANALYSIS.
408

COMPARING THE LYRICAL TEXT TO RESTRICTED INFORMATION, THE RESTRICTED INFORMATION INCLUDING A BLACKLIST OF WORDS, PHRASES, OR NAMES.
410

DETERMINING THAT THE LYRICAL TEXT DOES NOT CONTAIN BLACKLISTED CONTENT BASED ON THE COMPARING.
412

COMBINING THE AUDIO TRACK AND THE PRE-APPROVED COMPOSITION TO CREATE AN APPROVED SONG.
414

PUBLISHING THE APPROVED SONG TO A CATALOG OF INMATE CONTENT.
416

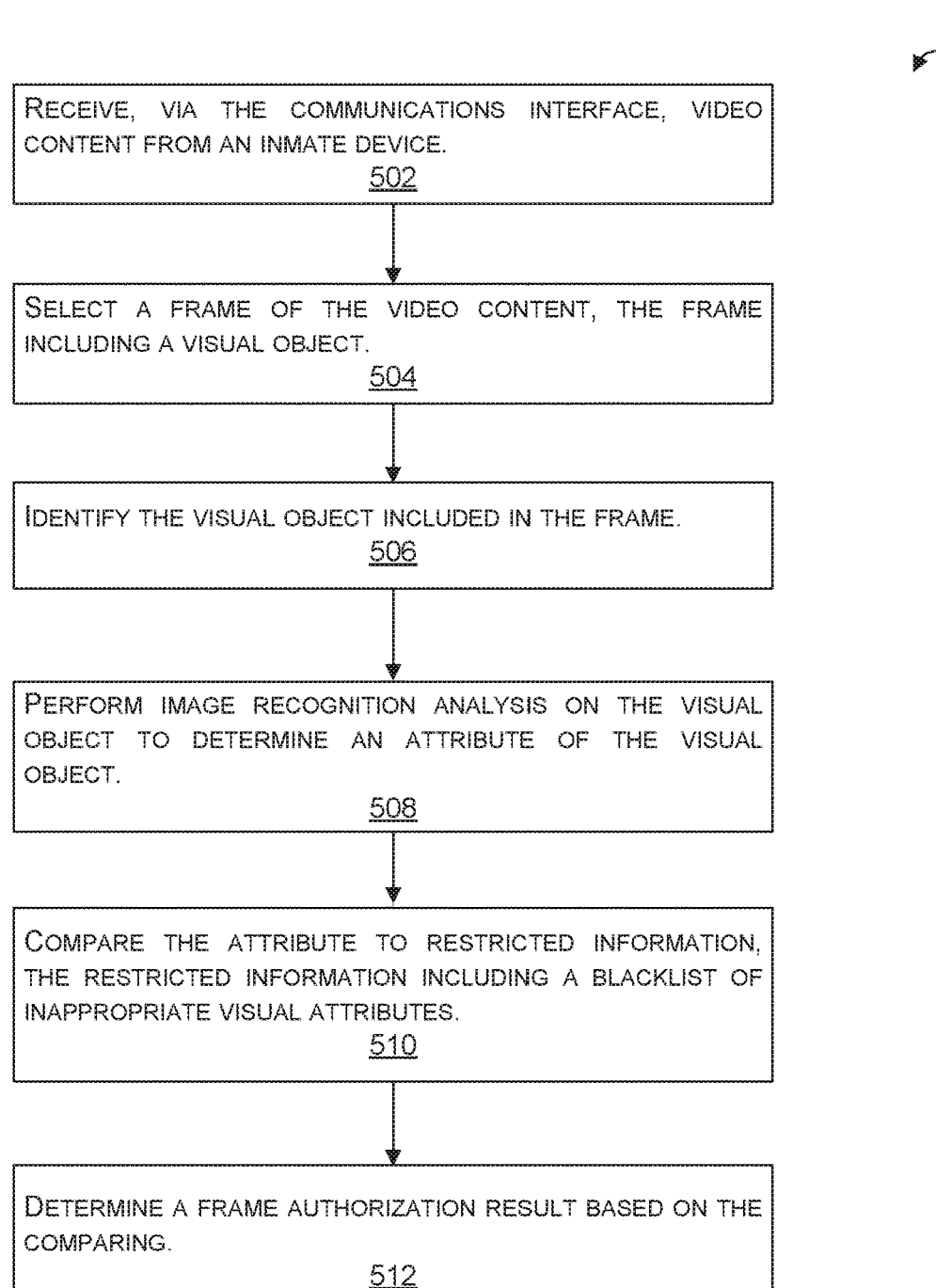

RECEIVE, VIA THE COMMUNICATIONS INTERFACE, VIDEO CONTENT FROM AN INMATE DEVICE.
502

SELECT A FRAME OF THE VIDEO CONTENT, THE FRAME INCLUDING A VISUAL OBJECT.
504

IDENTIFY THE VISUAL OBJECT INCLUDED IN THE FRAME.
506

PERFORM IMAGE RECOGNITION ANALYSIS ON THE VISUAL OBJECT TO DETERMINE AN ATTRIBUTE OF THE VISUAL OBJECT.
508

COMPARE THE ATTRIBUTE TO RESTRICTED INFORMATION, THE RESTRICTED INFORMATION INCLUDING A BLACKLIST OF INAPPROPRIATE VISUAL ATTRIBUTES.
510

DETERMINE A FRAME AUTHORIZATION RESULT BASED ON THE COMPARING.
512

FIG. 5

600

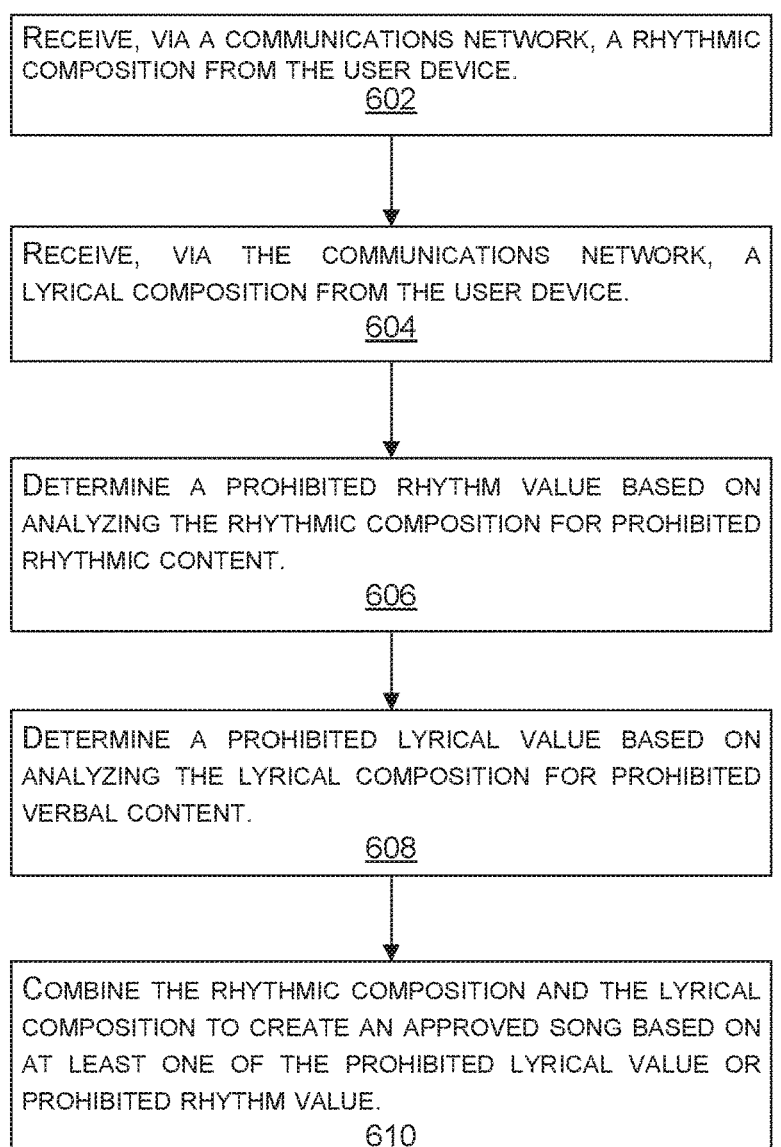

RECEIVE, VIA A COMMUNICATIONS NETWORK, A RHYTHMIC COMPOSITION FROM THE USER DEVICE.
602

RECEIVE, VIA THE COMMUNICATIONS NETWORK, A LYRICAL COMPOSITION FROM THE USER DEVICE.
604

DETERMINE A PROHIBITED RHYTHM VALUE BASED ON ANALYZING THE RHYTHMIC COMPOSITION FOR PROHIBITED RHYTHMIC CONTENT.
606

DETERMINE A PROHIBITED LYRICAL VALUE BASED ON ANALYZING THE LYRICAL COMPOSITION FOR PROHIBITED VERBAL CONTENT.
608

COMBINE THE RHYTHMIC COMPOSITION AND THE LYRICAL COMPOSITION TO CREATE AN APPROVED SONG BASED ON AT LEAST ONE OF THE PROHIBITED LYRICAL VALUE OR PROHIBITED RHYTHM VALUE.
610

FIG. 6

SYSTEM AND METHOD FOR AUDIO VISUAL CONTENT CREATION AND PUBLISHING WITHIN A CONTROLLED ENVIRONMENT

CROSS REFERENCE TO RELATED APPLICATIONS

This application is a Continuation of U.S. application Ser. No. 17/466,613 by Petty, entitled "SYSTEM AND METHOD FOR AUDIO VISUAL CONTENT CREATION AND PUBLISHING WITHIN A CONTROLLED ENVIRONMENT" filed Sep. 3, 2021, which is a Continuation of U.S. application Ser. No. 16/723,632 by Petty, entitled "SYSTEM AND METHOD FOR AUDIO VISUAL CONTENT CREATION AND PUBLISHING WITHIN A CONTROLLED ENVIRONMENT" filed Dec. 20, 2019, (now U.S. Pat. No. 11,115,716), which is a Continuation of U.S. application Ser. No. 16/025,721 by Petty, entitled "SYSTEM AND METHOD FOR AUDIO VISUAL CONTENT CREATION AND PUBLISHING WITHIN A CONTROLLED ENVIRONMENT" filed Jul. 2, 2018, (now U.S. Pat. No. 10,516,918), which is a Continuation of U.S. application Ser. No. 15/662,092 by Petty, entitled "SYSTEM AND METHOD FOR AUDIO VISUAL CONTENT CREATION AND PUBLISHING WITHIN A CONTROLLED ENVIRONMENT" filed Jul. 27, 2017 (now U.S. Pat. No. 10,015, 546), which are each incorporated herein by reference in its entirety.

FIELD OF THE INVENTION

This disclosure relates to systems and methods for content creation and publishing within a controlled environment.

BACKGROUND OF THE INVENTION

In a controlled environment, such as a correctional facility or prison, administrators may seek to provide opportunities for inmates to create media content, and share the media content with family and/or friends. However, administrators must ensure that the media content is appropriate for distribution to inmates within the controlled environment and/or media consumers outside of the controlled environment. For example, administrators may not want to distribute media content containing threats of violence, derogatory references, and/or copyrighted material.

BRIEF DESCRIPTION OF THE DRAWINGS/FIGURES

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which:

FIG. 4 is a flow diagram illustrating an example process for publishing authorized content within a controlled environment, according to exemplary embodiments.

FIG. 5 is a flow diagram illustrating an example process for authorizing visual content within a controlled environment, according to exemplary embodiments.

FIG. 6 is a flow diagram illustrating an example process for authorizing audio content within a controlled environment, according to exemplary embodiments.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
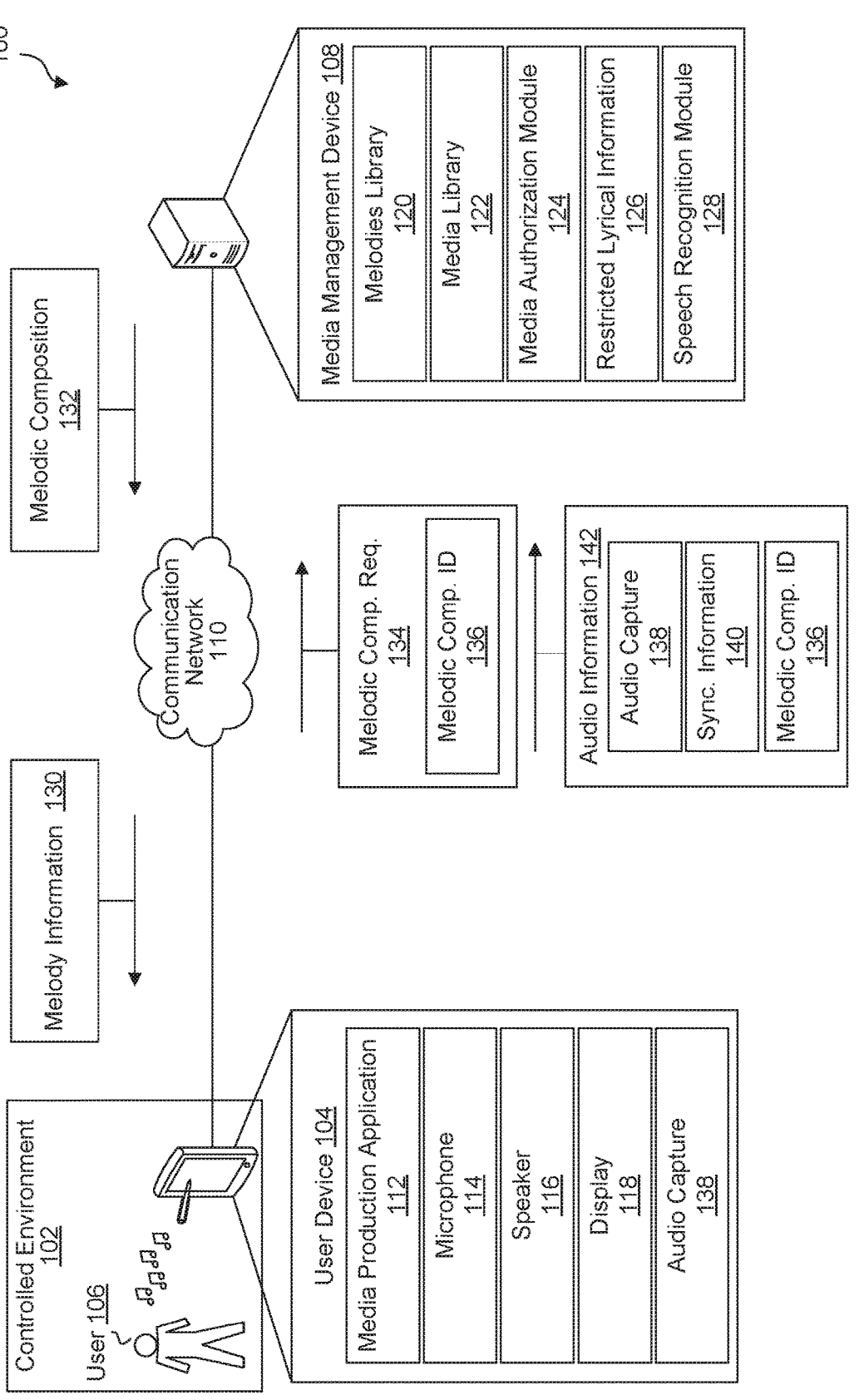
FIG. 1 depicts an example framework for providing a content creation and publishing system in a controlled environment, according to exemplary embodiments.

FIG. 1 illustrates an example framework for providing a content creation and publishing system 100 in a controlled environment 102, according to an exemplary embodiment. FIG. 1 shows illustrative interactions within the controlled environment 102 between a user device 104 associated with a user 106, and a media management device 108 via a communications network 110. Some examples of the user device 104 include smart phones and mobile communication devices, tablet computing devices, desktops, laptops, netbooks and other portable computers, wearable computing devices, and any other computing device capable of sending communications to the media management device 108. Further, the communications network 110 may include any or all of a private network, personal area network (PAN), Local-Area Network (LAN), a Wide-Area Network (WAN), or the Internet. Further, the connection between the user device 104 and/or the media management device 108, and the communications network 110 may be a wireless connection (e.g., Bluetooth™, Wi-Fi connection, etc.), or a wired connection (e.g., Ethernet, universal serial bus (USB), etc.).

As illustrated in FIG. 1, the user device 104 includes a media production application 112, a microphone 114, a speaker 116, and a display 118. The media production application 112 allows the user 106 to create and edit media content on the user device 104, as further described below with reference to FIG. 3. Some examples of media content include lyrical compositions, rhythmic compositions (e.g., instrumental accompaniments), audio compositions (e.g., songs, soundtracks, etc.), video compositions, and audio-visual compositions (e.g., music videos). In some embodiments, the media production application 112 includes features for recording, arranging, pre-mastering, mastering, mixing, tracking, sampling, sequencing, synchronizing, and/or engineering audio content. Further, the media production application 112 includes features for recording video content, trimming video content, re-sequencing video content, adding transitions between video content, and/or applying special effects to video content.

The media management device 108 manages the creation, authorization, and publishing of media content within the controlled environment 102. As illustrated in FIG. 1, the media management device 108 includes a melodies library 120, a media library 122, a media authorization module 124, restricted lyrical information 126, and a speech recognition module 128. The melodies library 120 includes musical compositions that the user 106 may use to create media content. For instance, the melodies library 120 includes instrumental accompaniments, soundtracks, audio samples, audio effects, and other audio compositions. In some embodiments, melodies must be approved before being added to melodies library 120. For instance, a melody may only be added to the melodies library 120 once it has been determined that the melody does not include prohibited content (e.g., vulgar content, unlicensed content, gang related attributes, etc.).

The media library 122 includes media content created by users within the controlled environment 102. Further, the media management device 108 provides devices within the controlled environment 102 access to the media content of the media library 122. For instance, the user device 104 may download or stream media content from the media library 122 for entertainment purposes.

The media authorization module 124 determines whether to publish media content, created by the user 106, to the media library 122. Once the media content is published to the media library 122, the media content is digitally acces-sible to devices (e.g., the user device 104) within the controlled environment. In some embodiments, the media authorization module 124 determines a probability that an item of media content includes prohibited content using speech recognition analysis. Some examples of prohibited content include profanity, vulgarity, slurs, obscenities, threats of violence, inappropriate noun usage (e.g., derogatory language about a person, place or thing), portions of unlicensed content, etc. Further, prohibited content also includes slang, idioms, and/or expressions associated with gang activity or illegal activity.

The restricted lyrical information 126 includes information that can be utilized to identify prohibited content in the lyrics of a song when performing speech recognition analysis. In some embodiments, the restricted lyrical information 126 includes a blacklist of prohibited words and/or phrases, audio samples representing prohibited words and/or phrases, machine learning models for detecting prohibited words and/or phrases in speech, and/or data for generating models for recognizing prohibited words and/or phrases in speech. Once the media authorization module 124 determines that the probability that media content includes prohibited content is below a predetermined threshold in view of the restricted lyrical information 126, the media authorization module 124 may publish the media content to the media library 122.

In an embodiment in which the user 106 endeavors to record and publish a song via the content creation and publishing system 100, the media management device 108 sends melody information 130 to the user device 104 via the communications network 110. The melody information 130 lists one or more melodic compositions of the melodies library 120 that the user 106 can utilize to create the new song. In some embodiments, the melody information 130 includes snippets (i.e., previews) of one or more melodic compositions included in the melodies library 120. The melody information 130 further includes metadata pertaining to the melodic compositions. In an embodiment, the metadata includes one or more attributes related to the individual melodic compositions (e.g., title, duration, key, artist, album, tempo, genre, time signature, bit rate, etc.).

Upon receipt of the melody information 130, the user device 104 presents, to the user 106, information associated with the melodic compositions identified in the melody information 130. For example, the media production application 112 presents a listing of the melodic compositions via the display 118. In addition, the user device 104 provides a preview of the melodic compositions to the user 106 via an audio playback device (e.g., the speaker 116) of the user device 104.

Further, the user 106 can select at least one melodic composition 132 listed in the melody information 130. Additionally, the user device 104 can send a melodic composition request 134 to the media management device 108 that indicates the at least one melodic composition 132 the user 106 would like to include in the song. For instance, the melodic composition request 134 includes a requested melodic composition identifier 136 that identifies the at least one melodic composition 132 the user 106 would like to use. Upon receipt of the melodic composition request 134, the media management device 108 sends the requested melodic composition 132 to the user device 104.

Once the user device 104 receives the requested melodic composition 132, the user 106 may begin to create the song using the requested melodic composition 132 via the media production application 112. For example, the media production application 112 can initiate a recording mode of a recording device (e.g., the microphone 114) of the user device 104, and record an audio capture 138 of lyrics recited by the user 106 into the recording device. As used herein, audio capture refers to audio data captured by a recording device connected to the user device 104, and stored to a storage component connected to the user device 104. In some embodiments, the media production application 112 reproduces the requested melodic composition 132 while the audio capture 138 is recorded by the media production application 112.

For example, the user device 104 reproduces the requested melodic composition 132 through an audio play-back device (e.g., headphones, speakers, etc.) connected to the user device 104, while the user 106 recites lyrics into the microphone 114. Further, the media production application 112 produces synchronization information 140 that indicates a temporal relationship between the requested melodic composition 132 and the audio capture 138. In certain embodiments, the synchronization information 140 indicates the portions of the requested melodic composition 132 and the audio capture 138 that should be reproduced simultaneously when the song is played.

After the user device 104 records the audio capture 138, the media production application 112 sends audio information 142 including the audio capture 138, the synchronization information 140, and the requested melodic composition identifier 136 to the media management device 108. Upon receipt of the audio information 142, the media authorization module 124 analyzes the audio information 142. For example, the media authorization module 124 instructs the speech recognition module 128 to determine a textual representation of the audio capture 138 included in the audio information 140. Further, the media management device 108 evaluates the textual representation in view of the restricted lyrical information 126. For instance, the media authorization module 124 determines whether any of the prohibited content represented by the restricted lyrical information 126 is present in the textual representation. If the media authorization module 124 determines that the textual representation does not include any of the prohibited content represented by the restricted lyrical information 126, the media management device 108 can mix and master the audio capture 138 and the requested melodic composition 132 based on the synchronization information 140 to create an approved song. Further, the media management device 108 publishes the approved song to the media library 122.

Figure 2:
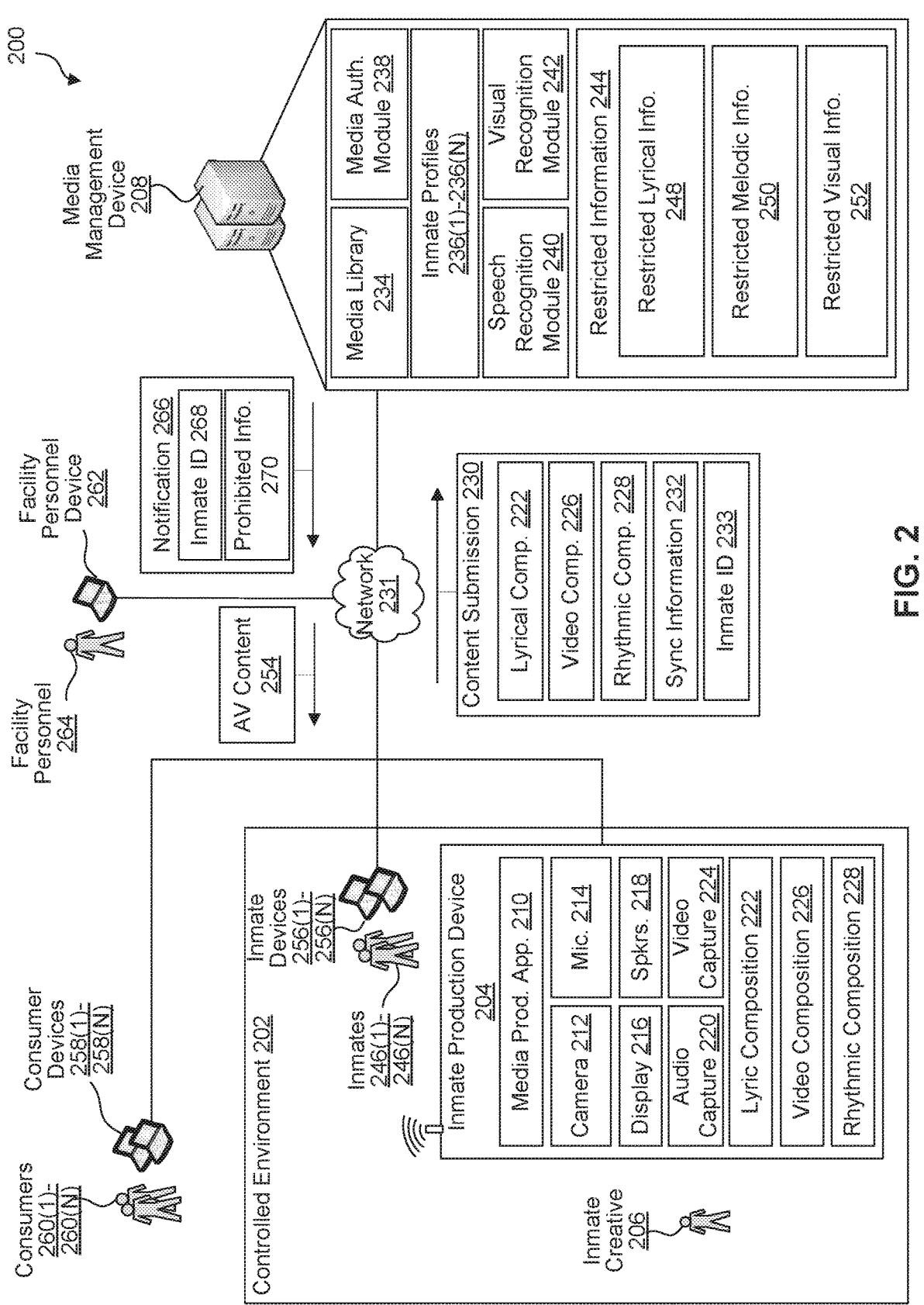
FIG. 2 depicts an example framework for providing a content creation and publishing system in a controlled environment, according to exemplary embodiments.

FIG. 2 illustrates an example framework for providing a content creation and publishing system 200 in a controlled environment 202, according to an exemplary embodiment. FIG. 2 shows illustrative interactions between an inmate production device 204, such as user device 104, associated with an inmate creative 206, and a media management device 208, such as media management device 108.

As illustrated in FIG. 2, the inmate production device 204 includes a media production application 210, a camera 212, a microphone 214, a display 216, and speakers 218. In some embodiments, the inmate creative 206 utilizes the media production application 210 to record audio capture 220 via the microphone 214 of the inmate production device 204. Additionally, or alternatively, the inmate creative 206 may use a voice recorder application installed on the inmate production device 204 to record the audio capture 220. Further, the inmate creative 206 can utilize the media production application 210 to manipulate and edit the audio capture 220 to create a lyrical composition 222. For example, the inmate creative 206 can use the media production application 210 to sequence multiple audio captures

220 into a lyrical composition 222. As another example, the inmate creative 206 can use the media production application 210 to apply audio effects (e.g., pitch correction, reverb, etc.) to the audio capture 220 in order to create the lyrical composition 222.

In addition, the inmate creative 206 utilizes the media production application 210 to record video capture 224 via the camera 212 of the inmate production device 204. As used herein, video capture refers to visual data captured by a video recording device, and stored to a storage component of the inmate production device 204. Additionally, or alternatively, the inmate creative 206 may use a camera app installed on the inmate production device 204 to record the video capture 224. Further, the inmate creative 206 can use the media production application 210 to manipulate and edit the video capture 224 to create a video composition 226. For example, the inmate creative 206 can use the media production application 210 to sequence multiple video captures 224 into a video composition 226. As another example, the inmate creative 206 can use the media production application 210 to apply visual effects (e.g., filters) to the video capture 224 in order to create the video composition 226.

Additionally, the inmate creative 206 can create a rhythmic composition 228 using the media production application 210. As further described in FIG. 3, the media production application 210 includes virtual instruments for creating the rhythmic composition 228. For instance, the inmate creative 206 may use a virtual drum or virtual piano to create the rhythmic composition 228. In some embodiments, the inmate creative 206 may further use the media production application 210 to combine the rhythmic composition 228 with the lyrical composition 222 and/or the video composition 226. As used herein, virtual instruments refer to digital components that implement the functionality of a musical instrument by computer, sensors, and/or actuators. Some example instruments that may be represented as virtual instruments include stringed instruments (e.g., guitar, bass, violin, viola, dulcimer, cello, piano, organ, and harpsichord), percussion instruments (e.g., timpani, snare drum, bass drum, cymbals, triangle, and tambourine), and wind instruments (e.g., horn, trumpets, trombone, euphonium, tuba, recorder, flute, oboe, clarinet, saxophone, and bassoon).

Once the inmate creative 206 has completed creating content media, the inmate creative 206 sends a content submission 230 to the media management device 208 via a network 231. As illustrated in FIG. 2, the content submission 230 includes at least one of the audio composition, video composition 226, or the rhythmic composition 228. Further, the content submission 230 includes synchronization information 232 that includes data for syncing the lyrical composition 222, video composition 226, or the rhythmic composition 228 according to the intent of the inmate creative 206. In addition, the content submission 230 includes an inmate identifier 233 that identifies the inmate creative 206 to the media management device 208 as the source of the content submission 230. Additionally, or alternatively, the content submission 230 includes the lyrical composition 222, video composition 226, and the rhythmic composition 228 combined into single content media. For instance, the lyrical composition 222, video composition 226, and the rhythmic composition 228 may be muxed together into a single digital data file.

The media management device 208 includes a media library 234, inmate profiles 236, a media authorization module 238, a speech recognition module 240, a visual recognition module 242, and restricted information 244. The media management device 208 maintains the inmate profiles 236 corresponding to inmates 246 located within the controlled environment 202. For example, the first inmate profile 236(1) is associated with the inmate creative 206. In some instances, the inmate profiles 236 include information from one or more of a jail management system (JMS) or an offender management system (OMS), a public database containing information on the inmates 246 or booking information. Further, the inmate profiles 236 include personal information such as previous residences or correctional facilities, gang affiliations, family members, related legal personnel (e.g., judges, prosecuting attorneys, and/or victims or witnesses associated with legal proceedings involving the inmates), languages spoken by the inmates 246, dialects spoken by the inmates 246, voice models associated with the inmates 246, incident reports, etc.

The restricted information 244 includes restricted lyrical information 248, restricted rhythmic information 250, and restricted visual information 252. The restricted lyrical information 248 identifies prohibited words, phrases, terms, and/or subject matters in a variety of languages and/or dialects. Further, the restricted lyrical information 248 identifies words, phrases, and/or terms that sound similar to and/or rhyme with the prohibited words, phrases, and/or terms. The restricted rhythmic information 250 identifies prohibited chords, chord progressions, phrases, motifs, melodies, and/or harmonies. The restricted visual information 252 identifies prohibited visual features, and includes machine learning models for detecting flesh tones and/or skin, prohibited body movements (obscene gestures, gang signs, etc.), and/or prohibited images (photographs, text captions, text overlay, etc.).

Upon receipt of the content submission 230, the media authorization module 238 analyzes the compositions (i.e., lyrical composition 222, rhythmic composition 228, and/or video composition 226) included in the content submission 230 in order to determine whether to publish the compositions or a combination of the compositions to the media library 234.

For instance, the media authorization module 238 employs the speech recognition module 240 to determine the lyrics of the lyrical composition 222. Further, in certain embodiments, the media management device 208 determines that the content submission 230 is associated with the inmate creative 206 based on the inmate identifier 233. Further, the media management device 208 analyzes the compositions in view of inmate information, such as inmate profile 226(1), associated with the inmate creative 206. For example, the speech recognition module 240 uses a voice profile included in the inmate profile 236(1) to perform speech recognition. Further, the media authorization module 238 determines whether the lyrics of the lyrical composition 222 include prohibited lyrical content based at least in part on the restricted lyrical information 248 and/or the inmate profiles 236. For example, the media authorization module 238 determines that the lyrics include one or more obscenities identified in the restricted lyrical information 248. In another example, the media authorization module 238 determines that the lyrics include threats of violence based on the restricted lyrical information 248, and that the threats are directed towards a witness in a trial against the inmate creative 206 based on the inmate profile 236(1) associated with the inmate creative 206. In yet another example, the media authorization module 238 determines that the lyrics include derogatory language directed to a cell block of the controlled environment 202 and/or a rival gang faction of the controlled environment 202 based at least in part on the restricted lyrical information 248 and/or the inmate profiles 236. In yet still another example, the media authorization module 238 may employ a machine learning model to determine a subject matter of the lyrics. Further, the media authorization module 238 determines that the identified subject matter is prohibited. For example, the lyrics may be directed to at least one of a retelling of a criminal act, escaping from the controlled environment 202, committing suicide, performing explicit sexual acts, or any other subject matter deemed inappropriate by the administration of the controlled environment 202.

In some other embodiments, the media authorization module 238 determines the likelihood that the lyrics contain prohibited content. For example, the media authorization module 238 determines that there is a high probability that the lyrics contain prohibited content based at least in part of a high amount of unrecognizable words and/or words that rhyme with obscenities. In some other examples, the media authorization module 238 determines that there is a high probability that the lyrics contain prohibited content based at least in part of a high amount of nouns present in the lyrics. In yet still some other examples, the media authorization module 238 identifies one or more lyrics that could potentially constitute prohibited lyrical content. In addition, the media authorization module 238 can provisionally reject the lyrical composition 222 until the identified lyrics are approved by an employee within the controlled environment 202.

Additionally, or alternatively, the media authorization module 238 can request that the inmate creative 206 provide lyrics corresponding to the lyrical composition 222, and utilize the inmate creative 206 provided lyrics to determine whether the lyrics contain prohibited lyrical content. For instance, the media authorization module 238 may identify a lyric as potentially constituting prohibited lyrical information based on an inability of the speech recognition module 240 to recognize the word or phrase of the lyric with a predetermined confidence. Further, the media authorization module 238 provides the lyrics submitted by the inmate creative 206 to the speech recognition module 240 to utilize in another attempt to determine the word or phrase. Once the word or phrase has been identified with a predetermined confidence, the media authorization module 238 compares the word or phrase to the restricted lyrical information 248. In some other instances, the media authorization module 238 compares the lyrics determined by the speech recognition module 240 to the lyrics provided by the inmate creative 206. Further, the media authorization module 238 may require human approval for any discrepancies between the lyrics determined by the speech recognition module 240 to the lyrics provided by the inmate creative 206. In addition, the lyrics provided by the inmate creative 206 can be used to further train a model of the speech recognition module 240 or modify a voice profile of the inmate creative 206 included in the inmate profile 236(1).

Further, the media authorization module 238 determines whether the rhythm composition includes any prohibited rhythmic content. For example, the media authorization module 238 determines that the rhythmic composition 228 includes one or more chords, chord progressions, phrases, motifs, melodies, and/or harmonies associated with a criminal organization based on comparing musical notation information associated with the rhythmic composition 228 to the restricted rhythmic information 250. In another example, the media authorization module 238 determines that the rhythmic composition 228 includes one or more chords, chord progressions, phrases, motifs, melodies, and/or harmonies associated with a gang associated with the inmate creative 206 based on comparing musical notation information associated with the rhythmic composition 228 to the restricted rhythmic information 250, and the inmate profile 236(1) corresponding to the inmate creative 206. In some other examples, the media authorization module 238 determines that the rhythmic composition 228 includes one or more chords, chord progressions, phrases, motifs, melodies, and/or harmonies associated with copyrighted material based on comparing musical notation information associated with the rhythmic composition 228 to the restricted rhythmic information 250.

In some embodiments, the media production application 210 provides musical notation information corresponding to the rhythmic composition 228 in the content submission 230. As described herein, musical notation information includes any data that can be used to represent aurally perceived music played with instruments or sung by the human voice. For instance, the rhythmic composition 228 can include musical sheet information corresponding to individual tracks of the rhythmic composition 228. Alternatively, the media authorization module 238 can determine musical notation information by performing musical notation analysis on the rhythmic composition 228.

In some embodiments, the media authorization module 238 can analyze the musical notes of each track of the rhythmic composition 228 individually when determining whether the rhythmic composition 228 includes prohibited rhythmic content. Additionally, or alternatively, the media authorization module 238 can analyze combinations of the tracks of the rhythmic composition 228 when determining whether the rhythmic composition 228 includes prohibited rhythmic content.

Further, the media authorization module 238 determines whether the video composition 226 includes any prohibited video content. For instance, the visual recognition module 242 identifies objects within a frame of the video composition 226, and determines image features of the identified objects. In some embodiments, the visual recognition module 242 uses the machine learning models of the restricted visual information 252 to perform feature extraction. Some examples of image features include shape, color, size, style, position, intensity, orientation, etc. Further, the media authorization module 238 compares the features of the identified objects to a blacklist of prohibited image features using the machine learning models of the restricted visual information 252 to determine whether the identified objects constitute prohibited video content.

For example, the visual recognition module 242 identifies a picture displayed in the video composition 226. Further, the visual recognition module 242 determines a shape of an object in the picture. Additionally, the media authorization module 238 determines that the video composition 226 includes prohibited video content based on the shape of the object being similar to a prohibited shape identified in the restricted visual information 252. In some embodiments, the media authorization module 238 determines the prohibited image features based at least in part on the inmate profile 236(1) associated with the inmate creative 206. For example, suppose the inmate profile 236(1) indicates that the inmate creative 206 possibly has a gang affiliation. As such, the media authorization module 238 determines whether the video composition 226 includes prohibited image features in the restricted visual information 252 that are associated with the gang affiliation, such as colors of the affiliated gang, colors of the rivals of the affiliated gang, an icon associated with the affiliated gang, or an icon associated with rivals of the affiliated gang.

As another example, the restricted visual information 252 includes a model trained to detect the amount of skin in a portion of a frame of video content. Further, the model determines a likelihood of nudity within the video composition 226 based at least in part on the amount of skin detected by the model. As yet another example, the restricted visual information 252 includes a model trained to detect text included in a text overlay of the video composition 226. Once the visual recognition module 242 determines the text of a text overlay, the media authorization module 238 determines whether the text constitutes prohibited content based at least in part on the restricted lyrical information 248.

In some other embodiments, the visual recognition module 242 uses machine learning to detect movements constituting prohibited video content. For instance, the visual detection module detects an object in a first frame, and the same object in one or more successive frames. Further, the media authorization module 238 determines that the movement of the object from the first frame to the one or more successive frames constitutes prohibited movement based at least in part on the restricted visual information 252 and/or the inmate profiles 236. For example, the media authorization module 238 may determine that the inmate creative 206 is affiliated with a gang based on the inmate profile 236(1) corresponding to the inmate creative 206. Additionally, the visual recognition module 242 determines that a person in the video composition 226 performs a body movement consistent with a gang sign of the affiliated gang. As such, the media authorization module 238 determines that the video composition 226 includes prohibited video content.

If the media authorization module 238 determines that the compositions included in the content submission 230 do not contain prohibited content, the content can be published to the media library 234. For example, if the media authorization module 238 determines that the lyrical composition 222, rhythmic composition 228, and the video composition 226 do not include prohibited content, the media authorization module 238 combines the lyrical composition 222, rhythmic composition 228, and the video composition 226 in accordance with the synchronization information 232 to create audio visual content 254. Further, the media authorization module 238 publishes the audio visual content 254 to the media library 234. Additionally, or alternatively, the media authorization module 238 may publish the audio visual content 254 to the media library 234 when the media authorization module 238 determines that the likelihood that the compositions include prohibited content is below a predetermined threshold, and/or once the audio visual content 254 has been approved by a supervisor associated with the controlled environment 202.

In addition, the media management device 208 sends the audio visual content 254 to inmate devices 256 within the controlled environment 202, and consumer devices 258 outside of the controlled environment 202 via the network 231. Individual inmates 246 are associated with particular inmate devices 256. For example, a first inmate 246(1) is associated with a first inmate device 256(1), an Nth inmate 246(N) is associated with an Nth inmate device 256(N), and so forth. Further, individual consumers 260 are associated with particular consumer devices 258. For example, a first consumer 260(1) is associated with a first consumer device 258(1), an Nth consumer 260(N) is associated with an Nth consumer device 214(N), and so forth. In some embodiments, the consumers 260 include family and/or friends of the inmates 246 within the controlled environment 202. Further, the consumer devices 258 may have to be pre-approved to access the content of the media library 234. In some instances, the consumers 260 can pay for access to content of the media library 234. For example, a family member of the inmate creative 206 can purchase access to content created by the inmate creative 206. In some other instances, the media management device 208 groups the content of the media library 234 into categories (e.g., genre, subject matter, language, etc.), and operates streaming radio stations corresponding to the different categories. Further, the inmates 246 can connect to the streaming radio stations and listen to content they have created.

If the media authorization module 238 determines that at least one of the compositions included in the content submission 230 contains prohibited content, the compositions will not be published to the media library 234. Further, the media management device 208 sends a notification 266 to a facility personnel device 262 associated with facility personnel 264 within the controlled environment 202. In some instances, the notification 266 includes an identifier 268 of the inmate creative 206, and prohibited information 270 associated with the composition that includes the prohibited content. For example, the notification 266 can include the name of the inmate creative 206, and the lyrics 270 containing prohibited lyrical content. Upon receipt of the notification 266 by facility personnel device 262, the facility personnel 264 can initiate disciplinary action directed to the inmate creative 206. For example, the facility personnel 264 could restrict access to the inmate production device 204 by the inmate creative 206.

In some embodiments, the media management device 208 further sends the notification 266 to the inmate production device 204. Upon receipt of the notification 266, the media production application 210 highlights the portions of the composition determined to contain prohibited content based on the prohibited information 270. Therefore, the inmate creative 206 is afforded the opportunity to edit the composition and resubmit the content submission 230. Alternatively, the notification 266 may instruct the media production application 210 to delete the compositions containing the prohibited information 270. Thereby preventing the inmate creative 206 from having personal access to the compositions containing prohibited content. For example, suppose the media authorization module 238 determines that lyrical composition 222 includes prohibited subject matter, the notification 266 will instruct the media production application 210 to delete the local copy of the lyrical composition 222 from the inmate production device 204.

Figure 3:
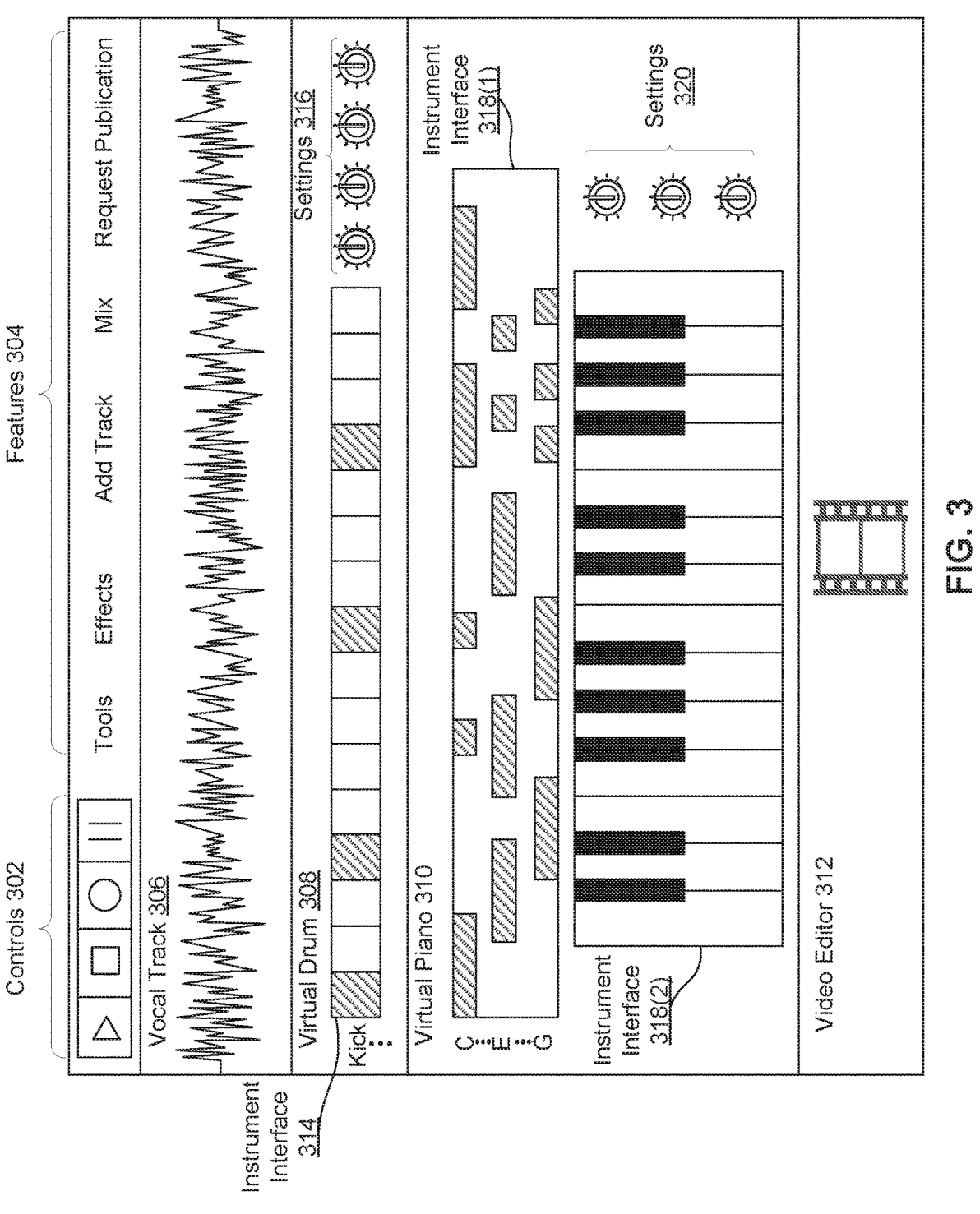
FIG. 3 depicts an example graphical user interface for providing a media production application in a controlled environment, according to exemplary embodiments.

FIG. 3 illustrates an example graphical user interface 300 for providing a media production application in a controlled environment, according to an exemplary embodiment. In some embodiments, the graphical user interface 300 is displayed when an inmate creative is creating media content comprising audio and visual content in a project of the media production application, such as media production application 210.

The graphical user interface 300 includes a controls section 302, a features section 304, a vocal track section 306, a virtual drum section 308, a virtual piano section 310, and a video editor section 312. As illustrated in FIG. 3, the controls section 302 includes control interfaces for playback functionality, playback-stop functionality, recording functionality, and playback-pause functionality. Further, the features sections 304 includes interfaces for accessing tools provided by the media production application, adding effects to audio and/or video content, adding a new track to the project, mixing individual tracks of the project to create new media content, and requesting publishing of the new media content to a media library, such as media library 234.

As illustrated in FIG. 3, the vocal track section 306 displays a graphical representation of audio capture, such as audio capture 220. Further, the inmate creative can modify and/or edit the graphical representation to produce a lyrical composition, such as lyrical composition 222. For instance, the media production application provides tools for selection a portion of the graphical representation of the audio capture, and adjusting the pitch of the audio capture corresponding to the selected portion of the graphical representation. Further, the virtual drum section 308 includes an instrument interface 314 that provides a graphical user interface for creating drum patterns using at least one or more types of drums (e.g., kick drum, cymbal, hi-hat, etc.). In addition, the virtual drum section 308 includes one or more setting controllers 316 for modifying audio attributes of the drum pattern.

Additionally, the virtual piano section 310 includes instrument interface 318(1) and an instrument interface 318(2), which provide graphical user interfaces for creating piano compositions using the different keys of a piano. In some embodiments, the inmate creative creates the piano composition by drawing a representation of a piano press on to the instrument interface 318(1). In some other examples, the inmate creative presses a representation of the piano keys in the instrument interface 318(2) to create the piano compositions. Further, input to the instrument interface 318(1) may be represented in the instrument interface 318(2), and vice versa. In addition, the virtual piano section 310 includes one or more setting controllers 320 for modifying audio attributes of the piano composition. The video editor section 312 provides an interface for trimming video content, re-sequencing video content, adding transitions between video content, and/or applying special effects to video content.

FIG. 4 illustrates a process 400 for publishing authorized content within a controlled environment, according to an exemplary embodiment. The process 400 is illustrated as a collection of blocks in a logical flow graph, which represent a sequence of operations that can be implemented in hardware, software, or a combination thereof. The blocks are referenced by numbers 402-416. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, a media management device sends, to an inmate device within a controlled environment, a composition identifier of a pre-approved audio composition. For example, the media management device 108 sends, to the user device 104, previews of a plurality of melodic compositions included in the melodies library 120.

At 404, the media management device receives, from the inmate device, a selection of the composition identifier. For example, the media management device 108 receives, from the user device, the melodic composition request 134 for a melodic composition 132 of the melodies library 120. Further, the melodic composition request 134 includes the melodic composition identifier 136 corresponding to the melodic composition 132.

At 406, the media management device receives, from the inmate device, an audio track including lyrical content. For example, the media management device 108 receives, from user device 104, audio information 142 that includes the audio capture 138 (i.e., lyrical content).

At 408, the media management device converts the lyrical content of the audio track into lyrical text using speech recognition analysis. For example, the speech recognition module 128 analyzes the audio capture 138 to determine lyrical text corresponding to the audio capture 138. In some embodiments, the speech recognition module 128 determines one or more languages associated with the user 106 based at least in part on user information (e.g., inmate profile 236). Further, the speech recognition module 128 determines the lyrical text corresponding to the audio capture based on the one or more languages. For instance, if the user information indicates that the user 106 is fluent in two languages, the speech recognition employs machine learning models associated with the two languages in order to perform speech recognition. In some other examples, the speech recognition module 128 identifies a voice sample associated with the user 106. Further, the speech recognition module 128 determines the lyrical text based on the voice sample. For instance, the speech recognition module 128 employs a machine learning model associated with the voice sample to perform speech recognition.

At 410, the media management device compares the lyrical text to restricted information, the restricted information including a blacklist of words, phrases, or names. For example, the media authorization module 124 analyzes the lyrical text corresponding to the audio capture 138 to determine if the lyrical text contains words, phrases, or names included in the restricted lyrical information 126.

At 412, the media management device determines that the lyrical text does not contain blacklisted content based on the comparing. For example, the media authorization module 124 determines that the lyrical text corresponding to the audio capture 138 does not include any terms deemed inappropriate by the administration within the controlled environment 102.

At 414, the media management device combines the audio track and the pre-approved composition to create an approved song. For example, the media authorization module 124 identifies the melodic composition 132 based in part on the melodic composition identifier 136 included in the audio information 142. Further, the media authorization module 124 combines the audio capture 138 with the melodic composition 132 in accordance with the synchronization information 140 to create an audio composition.

At 416, the media management device publishes the approved song to a catalog of inmate content. For example, the media authorization module 124 stores the audio composition in the media library 122. Once the audio composition is stored in the media library 122, other devices in the controlled environment 102 can access the audio composition for entertainment purposes and/or to create derivative works.

FIG. 5 illustrates a process 500 for authorizing visual content within a controlled environment, according to an exemplary embodiment. The process 500 is illustrated as a collection of blocks in a logical flow graph, which represent a sequence of operations that can be implemented in hardware, software, or a combination thereof. The blocks are referenced by numbers 502-510. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, a media management device receives, via a communications interface, video content from an inmate device. For example, the media management device 208 receives the video composition 226 in the content submission 230 from the inmate production device 204.

At 504, the media management device selects a frame of the video content, the frame including a visual object. For example, the media authorization module 238 selects the first frame of the video composition 226. Further, the first frame of the video composition 226 displays a visual object.

At 506, the media management device identifies the visual object included in the frame. For example, the visual recognition module 242 determines that the first frame of the video composition 226 displays the visual object. In some instances, the visual recognition module 242 employs machine learning techniques to identify the visual object within the first frame of the video composition 226.

At 508, the media management device performs image recognition analysis on the visual object to determine an attribute of the visual object. For example, the visual recognition module 242 employs machine learning techniques to determine one or more features of the visual object.

At 510, the media management device compares the attribute to restricted information, the restricted information including a blacklist of inappropriate visual attributes. For example, the media authorization module 238 analyzes the one or more features to determine whether the visual object includes prohibited images, prohibited body movements, and/or visual features as defined by the restricted visual information 252. In certain embodiments, the media authorization module 238 employs machine learning techniques to determine whether the one or more features of the visual object are similar to features indicative of the presence of the restricted visual information 252.

At 512, the media management device determines a frame authorization result based on the comparing. The media authorization module 238 determines that the video composition 226 is authorized for distribution based at least in part on the media authorization module 238 determining that the visual object does not include restricted visual information 252 and/or determining that the likelihood the visual object includes restricted visual information 252 is below a pre-determined threshold.

FIG. 6 illustrates a process 600 for authorizing audio content within a controlled environment, according to an exemplary embodiment. The process 600 is illustrated as a collection of blocks in a logical flow graph, which represent a sequence of operations that can be implemented in hardware, software, or a combination thereof. The blocks are referenced by numbers 602-610. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 602, a media management device receives, via the communications network, a rhythmic composition from the user device. For example, the media management device 208 receives, from the inmate production device 204, the rhythmic composition 228 included in the content submission 230.

At 604, the media management device receives, via the communications network, a lyrical composition from the user device. For example, the media management device 208 receives, from the inmate production device 204, the lyrical composition 222 included in the content submission 230.

At 606, the media management determines a prohibited rhythm value based on analyzing the rhythmic composition for prohibited rhythmic content. For example, the media authorization module 238 determines musical notation information corresponding to the rhythmic composition 228. In some embodiments, the rhythmic composition 228 includes the musical notation information. In some other examples, the media authorization module 238 analyzes the rhythmic composition 228 to determine the musical notation information.

Further, the media authorization module 238 determines whether the musical notation information includes restricted melodic information 250. For instance, the media authorization module 238 determines the likelihood that the musical notation information includes one or more chords associated with a criminal organization having members within the controlled environment 202. In some other instances, the media authorization module 238 determines the likelihood that the musical notation information includes one or more chords associated with copyrighted material.

At 608, the media management device determines a prohibited lyric value based on analyzing the lyrical composition for prohibited verbal content. For example, the speech recognition module 240 analyzes the lyrical composition 222 to determine lyrical text corresponding to the lyrical composition 222. Further, the media authorization module 238 analyzes the lyrical text corresponding to the lyrical composition 134 to determine the likelihood that the lyrical text contains words, phrases, or names associated with the restricted lyrical information 126.

For instance, the media authorization module 238 determines the likelihood that the lyrical text includes colloquial phrases associated with a criminal organization having members within the controlled environment 202. In some other instances, the media authorization module 238 determines the likelihood the lyrical text includes one or more lyrics associated with copyrighted material.

At 610, the media management device combines the rhythmic composition and the lyrical composition to create an approved song based on at least one of the prohibited lyric value or prohibited rhythm value. For example, the media authorization module 238 combines the lyrical composition 222 with the rhythmic composition 228 in accordance with the synchronization information 232 included in the content submission 230 to create an audio composition.

Figure 7:
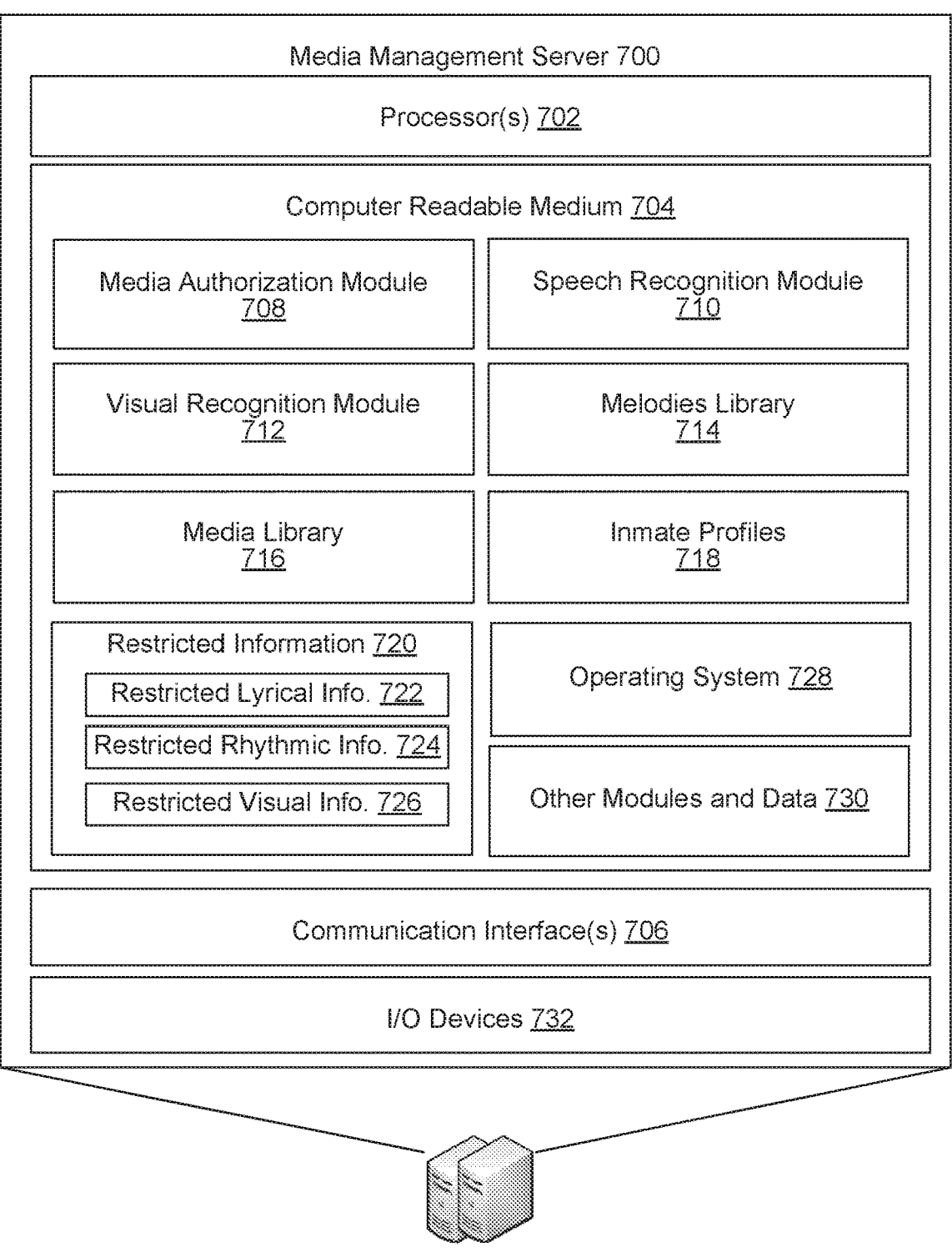
FIG. 7 illustrates select components of an example media management device, according to exemplary embodiments.

FIG. 7 illustrates select components of the media management server 700, such as media management device 108 and media management device 208. The media management server 700 includes one or more servers or other types of computing devices that may be embodied in any number of ways. For instance, the modules, other functional components, and data may be implemented on a single server, a cluster of servers, a server farm or data center, a cloudhosted computing service, and so forth, although other computer architectures may additionally or alternatively be used.

Further, while the figures illustrate the components and data of the media management server 700 as being present in a single location, these components and data may alternatively be distributed across different computing devices and different locations in any manner. Consequently, the functions may be implemented by one or more computing devices, with the various functionality described above distributed in various ways across the different computing devices. Multiple media management servers 700 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the media management server 700 includes one or more processors 702, one or more computer-readable media 704, and one or more communication interfaces 706. Each processor 702 is a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 include volatile and nonvolatile memory and/or removable and non-removable media implemented in any type of technology for storage of information, such as computer-readable instructions, data structures, program modules, or other data. Such computer-readable media 704 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the media management server 700, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 is used to store any number of functional components that are executable by the processors 702. In many implementations, these functional components comprise instructions or programs that are executable by the processors and that, when executed, specifically configure the one or more processors 702 to perform the actions attributed above to the media management server 700. In addition, the computer-readable media 704 store data used for performing the operations described herein.

In the illustrated example, the functional components stored in the computer-readable media 704 include a media authorization module 708, a speech recognition module 710, and a visual recognition module 712. Further, the computer-readable media store a melodies library 714, a media library 716, inmate profiles 718, and restricted information 720. Further, the restricted information 720 includes restricted lyrical information 722, restricted melodic information 724, and restricted visual information 726.

Additional functional components stored in the computer-readable media 704 include an operating system 728 for controlling and managing various functions of the media management server 700. The media management server 700 also include or maintain other functional components and data, such as other modules and data 730, which include programs, drivers, etc., and the data used or generated by the functional components. Further, the media management server 700 includes many other logical, programmatic and physical components, of which those described above are merely examples that are related to the discussion herein.

The communication interface(s) 706 include one or more interfaces and hardware components for enabling communication with various other devices, such as the inmate device(s) 256, the facility personnel device 262 or other computing devices, over the network(s) 231. For example, communication interface(s) 706 facilitate communication through one or more of the Internet, cable networks, cellular networks, wireless networks (e.g., Wi-Fi, cellular) and wired networks. As several examples, the media management server 700 and the inmate production device 204 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

The media management server 700 may further be equipped with various input/output (I/O) devices 732. Such I/O devices include a display, various user interface controls (e.g., buttons, joystick, keyboard, mouse, touch screen, etc.), audio speakers, connection ports and so forth.

Figure 8:
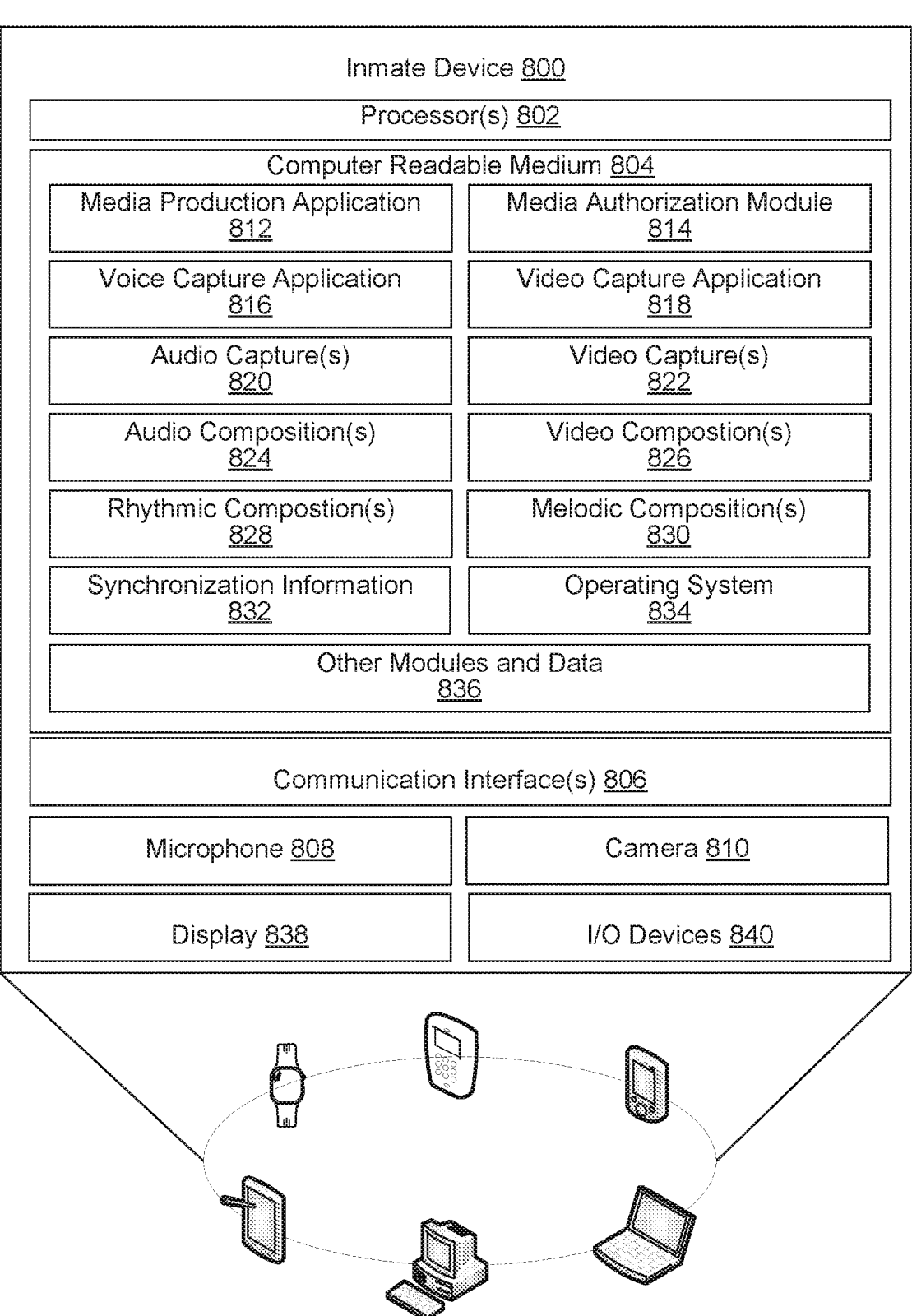
FIG. 8 illustrates select components of an example inmate production device, according to exemplary embodiments.

FIG. 8 illustrates select example components of the inmate device 800, such as the user device 104, the inmate production device 204, and the inmate devices 256, that implement the functionality described above, according to an exemplary embodiment. The inmate device 800 may be any of a number of different types of personal computing devices. Some examples of the inmate device 800 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 800 includes one or more processors 802, one or more computer-readable media 804, one or more communication interfaces 806, a microphone 808, and a camera 810. Each processor 802 is a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 include volatile and nonvolatile memory and/or removable and non-removable media implemented in any type of technology for storage of information, such as computer-readable instructions, data structures, program modules, or other data. Such computer-readable media 804 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 800, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 is used to store any number of functional components that are executable by the processors 802. In many implementations, these functional components comprise instructions or programs that are executable by the processors and that, when executed, specifically configure the one or more processors 802 to perform the actions attributed above to the user device 104 and the inmate production device 204. In addition, the computer-readable media 804 store data used for performing the operations described herein.

In the illustrated example, the functional components stored in the computer-readable media 804 include a media production application 812, a media authorization module 814, a voice capture application 816, and a video capture application 818. Further, the computer-readable media includes audio capture(s) 820, video capture(s) 822, audio compositions 824, video compositions 826, rhythmic compositions 828, melodic compositions 830, and synchronization information 832. In some embodiments, the media authorization module 814 locally performs functions of the media authorization module 708.

Additional functional components stored in the computer-readable media 804 include an operating system 834 for controlling and managing various functions of the inmate device 800. The inmate device 800 also includes or maintains other functional components and data, such as other modules and data 836, which include programs, drivers, etc., and the data used or generated by the functional components. Further, the inmate device 800 includes many other logical, programmatic and physical components, of which those described above are merely examples that are related to the discussion herein.

The communication interface(s) 806 includes one or more interfaces and hardware components for enabling communication with various other devices, such as the media management server 208, the facility personnel device 264, or other computing devices, over the network(s) 231. For example, communication interface(s) 806 facilitates communication through one or more of the Internet, cable networks, cellular networks, wireless networks (e.g., Wi-Fi, cellular) and wired networks. As several examples, the media management server 210 and the inmate device 800 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 8 further illustrates that the inmate device 800 includes a display 838. Depending on the type of computing device used as the inmate device 800, the display 838 may employ any suitable display technology. For example, the display 838 may be a liquid crystal display, a light emitting diode display, or any other suitable type of display able to present digital content thereon. In some embodiments, the display 838 includes touch sensor with the display 838 to provide a touchscreen display configured to receive touch inputs for enabling interaction with a graphic interface presented on the display 838. Accordingly, implementations herein are not limited to any particular display technology. Alternatively, in some other embodiments, the inmate device 800 may not include a display 838.

Furthermore, the inmate device 800 is equipped with various input/output (I/O) devices 840. Such I/O devices 840 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, etc.), and so forth. Additionally, the inmate device 800 includes various other components that are not shown, examples of which include removable storage, a power source, such as a battery and power control unit, and so forth.

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A media publishing device, comprising:
a transceiver configured to receive a work for publication;
a memory configured to store the received work; and
one or more processors configured to:
receive, via the transceiver from an external user device, audio associated with the work for publication, synchronization information, and a requested composition, wherein the synchronization information indicates a temporal relationship between the requested composition and the audio;
perform a content analysis of the stored work, the content analysis including a first analysis of video data of the stored work based on a first machine-learning model configured to review the stored work for restricted images, and including a second analysis of audio data of the stored work based on a second machine-learning model configured to review the stored work for restricted audio including copyrighted audio, the second analysis including comparing words and rhythmic composition of the stored work to a known rhythmic composition and identifying words and phrases within the stored work that rhyme with prohibited words and phrases within the known rhythmic composition;
in response to the stored work passing the content analysis:
generate audio-visual media for output based on combining the audio and the requested composition according to the synchronization information; and
publish the audio-visual media to a catalog of inmate content.

2. The media publishing device of claim 1, wherein the publishing includes transmitting the stored work to a publication server for electronic storage and retrieval.

3. The media publishing device of claim 1, wherein the one or more processors are further configured to analyze the stored work for restricted lyrics.

4. The media publishing device of claim 3, wherein the one or more processors are further configured to convert lyrical content of the received work into lyrical text using speech recognition analysis.

5. The media publishing device of claim 4, wherein the analysis for restricted lyrics includes:
comparing words included in the lyrical text to a database of restricted words; and
identifying, based on the comparing, words in the lyrical text that are prohibited from publication.

6. The media publishing device of claim 1, wherein the one or more processors are further configured to:
select a frame of video from the received work;
identify a visual object included in the selected frame using image recognition analysis;
compare the identified visual object to a plurality of prohibited objects; and
allow or filter the identified visual object based on the comparing.

7. A media publishing method, comprising:
receiving, via a transceiver from an external user device, a work for publication, the work including audio associated with the work for publication, synchronization information, and a requested composition, wherein the synchronization information indicates a temporal relationship between the requested composition and the audio;
storing the received work;
performing a content analysis of the stored work, the content analysis including a first analysis of video data of the stored work based on a first machine-learning model configured to review the stored work for restricted images, and including a second analysis of audio data of the stored work based on a second machine-learning model configured to review the stored work for restricted audio including copyrighted audio, the second analysis including comparing words and rhythmic composition of the stored work to a known rhythmic composition and identifying words and phrases within the stored work that rhyme with prohibited words and phrases within the known rhythmic composition;

in response to the stored work passing the content analysis:

generating audio-visual media for output based on combining the audio and the requested composition according to the synchronization information; and publishing the audio-visual media to a catalog of inmate content.

8. The media publishing method of claim 7, wherein the publishing includes transmitting the stored work to a publication server for electronic storage and retrieval.

9. The media publishing method of claim 7, further comprising analyzing the stored work for restricted lyrics.

10. The media publishing method of claim 9, further comprising converting lyrical content of the received work into lyrical text using speech recognition analysis.

11. The media publishing method of claim 10, wherein the analysis for restricted lyrics includes:

comparing words included in the lyrical text to a database of restricted words; and identifying, based on the comparing, words in the lyrical text that are prohibited from publication.

12. The media publishing method of claim 7, further comprising:

selecting a frame of video from the received work;

identifying a visual object included in the selected frame using image recognition analysis;

comparing the identified visual object to a plurality of prohibited objects; and allowing or filter the identified visual object based on the comparing.

13. A non-transitory computer readable storage device having stored thereon a plurality of instructions that, when executed by one or more processors of a computing device, cause the one or more processors to perform functions comprising:

receiving, via a transceiver from an external user device, a work for publication, the work including audio associated with the work for publication, synchronization information, and a requested composition, wherein the synchronization information indicates a temporal relationship between the requested composition and the audio;

storing the received work;

performing a content analysis of the stored work, the content analysis including a first analysis of video data of the stored work based on a first machine-learning model configured to review the stored work for restricted images, and including a second analysis of audio data of the stored work based on a second machine-learning model configured to review the stored work for restricted audio including copyrighted audio, the second analysis including comparing words and rhythmic composition of the stored work to a known rhythmic composition and identifying words and phrases within the stored work that rhyme with prohibited words and phrases within the known rhythmic composition;

in response to the stored work passing the content analysis:

generating audio-visual media for output based on combining the audio and the requested composition according to the synchronization information; and publishing the audio-visual media to a catalog of inmate content.

14. The non-transitory computer readable storage medium of claim 13, wherein the publishing includes transmitting the stored work to a publication server for electronic storage and retrieval.

15. The non-transitory computer readable storage medium of claim 13, the functions further comprising analyzing the stored work for restricted lyrics and;

converting lyrical content of the received work into lyrical text using speeck recognition analysis.

16. The non-transitory computer readable storage medium of claim 4, wherein the analysis for the restricted lyrics includes:

comparing words included in the lyrical text to a database of restricted words; and identifying, based on the comparing, words in the lyrical text that are prohibited from publication.

17. The non-transitory computer readable storage medium of claim 13, the functions further comprising:

selecting a frame of video from the received work;

identifying a visual object included in the selected frame using image recognition analysis;

comparing the identified visual object to a plurality of prohibited objects; and allowing or filter the identified visual object based on the comparing.

\* \* \* \* \*